(12) United States Patent
Takachio et al.

(10) Patent No.: US 7,765,201 B2
(45) Date of Patent: Jul. 27, 2010

(54) SYSTEM AND METHOD OF MAKING SEARCH FOR DOCUMENT IN ACCORDANCE WITH QUERY OF NATURAL LANGUAGE

(75) Inventors: Katsuhiko Takachio, Kokubunji (JP); Koichi Sasaki, Sendai (JP); Akemi Sasaki, legal representative, Sendai (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 365 days.

(21) Appl. No.: 11/373,991

(22) Filed: Mar. 14, 2006

(65) Prior Publication Data
US 2006/0206463 A1 Sep. 14, 2006

(30) Foreign Application Priority Data
Mar. 14, 2005 (JP) ............................. 2005-071032

(51) Int. Cl.
*G06F 7/00* (2006.01)
(52) U.S. Cl. .................................................... 707/713
(58) Field of Classification Search ...................... 707/4
See application file for complete search history.

(56) References Cited

U.S. PATENT DOCUMENTS

| | | | | |
|---|---|---|---|---|
| 5,251,129 | A * | 10/1993 | Jacobs et al. | 704/9 |
| 5,983,216 | A * | 11/1999 | Kirsch et al. | 707/2 |
| 6,078,914 | A | 6/2000 | Redfern | 707/3 |
| 6,088,692 | A * | 7/2000 | Driscoll | 707/5 |
| 6,460,029 | B1 * | 10/2002 | Fries et al. | 707/3 |
| 6,675,159 | B1 * | 1/2004 | Lin et al. | 707/3 |
| 6,766,316 | B2 * | 7/2004 | Caudill et al. | 707/3 |
| 6,901,399 | B1 * | 5/2005 | Corston et al. | 707/6 |
| 7,181,683 | B2 * | 2/2007 | Chang | 715/231 |
| 2001/0053968 | A1 * | 12/2001 | Galitsky et al. | 704/9 |
| 2003/0093276 | A1 * | 5/2003 | Miller et al. | 704/257 |

(Continued)

FOREIGN PATENT DOCUMENTS

JP 7-182373 7/1995

(Continued)

OTHER PUBLICATIONS

Notice of Reasons for Rejection mailed Jun. 17, 2008 from the Japanese Patent Office for corresponding Japanese Patent Application No. 2005-071032.

(Continued)

*Primary Examiner*—Tony Mahmoudi
*Assistant Examiner*—Jensen Hu
(74) *Attorney, Agent, or Firm*—Finnegan, Henerson, Farabow, Garrett & Dunner, L.L.P.

(57) ABSTRACT

A first interface accepts a user specified first question sentence. A question analysis unit analyzes the first question sentence. When the first question sentence queries a plurality of matters, the question analysis unit generates a plurality of second question sentences for individually querying each of the plurality of matters from the first question sentence. A search engine makes searches for documents which match respective matters queried by the plurality of second question sentences from a morphological index database in accordance with the plurality of second question sentences. A second interface provides a user with a search result for the first question having reflected thereon results of document searches for the plurality of second question sentences by the search engine.

10 Claims, 5 Drawing Sheets

U.S. PATENT DOCUMENTS

2004/0193596 A1 * 9/2004 Defelice et al. ................ 707/5

FOREIGN PATENT DOCUMENTS

JP        2004-133510        4/2004

OTHER PUBLICATIONS

Manabu Okumura et al., "Automated Text Summarization: A Survey," Journal of Natural Language Processing, vol. 6, No. 6, Jul. 10, 1999, pp. 1-26.

Tatsunori Mori et al., "Multi-Answer-Focused Multi-Document Summarization Using a Question-Answering System," IPSJ SIG Technical Report, vol. 2004, No. 73, Jul. 16, 2004, pp. 167-174.

* cited by examiner

Teach a sales price and features of ABC book
(ABC bukku no urine to tokuchou wo oshiete) — Q F I G. 4A  Teach sales price of ABC book (ABC bukku no urine wo oshiete) ~Q1

F I G. 4B  Teach features of ABC book (ABC bukku no tokuchou wo oshiete) ~Q2

F I G. 5A  D1: ABC book is an "open" price, but actual sales price in market is about 220,000 Yen. Price reduction is lesser as compared with produces of other competitors having same functions, indicating sound sales.

F I G. 5B  A1: ABC book is an "open" price, but actual sales price in market is about 220,000 Yen.

F I G. 6A  D2: New ABC book is characterized by incorporating television tuner and achieving high image quality and high sound quality as compared with conventional products.

F I G. 6B  A2: New ABC book is characterized by incorporating television tuner and achieving high image quality and high sound quality as compared with conventional products.

FIG. 7    ABC book is an "open" price, but actual sales price in market is about 220,000 Yen. New ABC book is characterized by incorporating television tuner and achieving high image quality and high sound quality as compared with conventional products. — RD FIG. 8A    ABC book is an "open" price, but actual sales price in market is about 220,000 Yen. Price reduction is lesser as compared with produces of other competitors having same functions, indicating sound sales. — D1a FIG. 8B    ABC book is an "open" price, but actual sales price in market is about 220,000 Yen. — A1a FIG. 8C    Let us summarize market price of new personal computer in this summer. Many shops present price of about 220,000 Yen for ABC book available from company T. — D1b FIG. 8D    Many shops present price of about 220,000 Yen for ABC book available from company T. — A1b

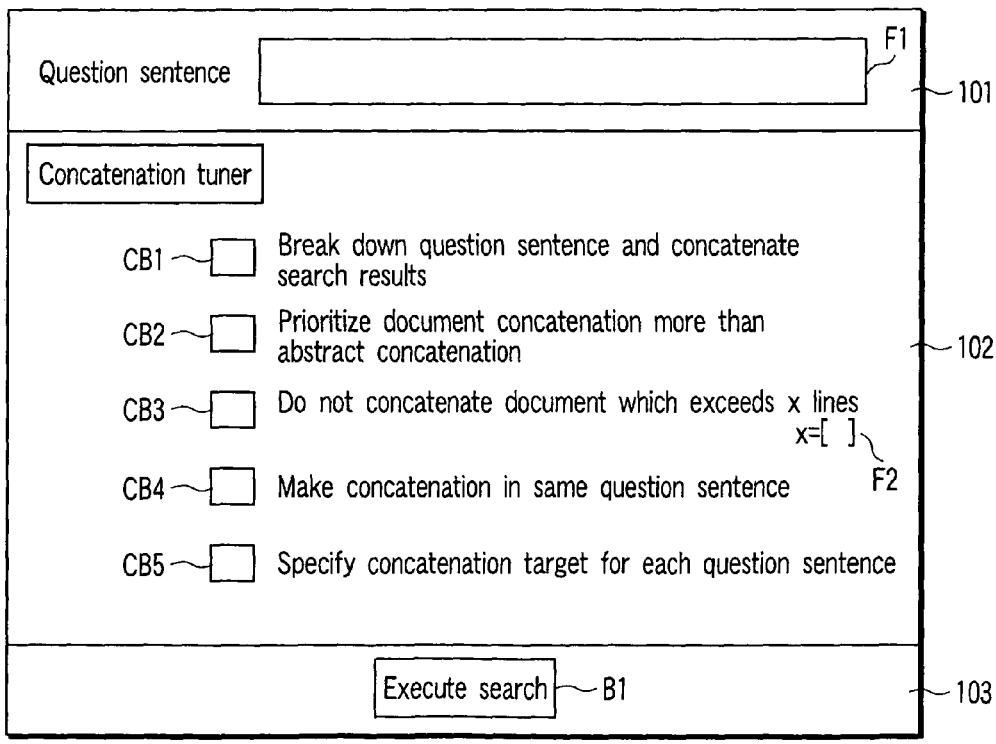

FIG. 9A  New ABC book is characterized by incorporating television tuner and achieving high image quality and high sound quality as compared with conventional products. — D2a FIG. 9B  New ABC book is characterized by incorporating television tuner and achieving high image quality and high sound quality as compared with conventional products. — A2a FIG. 9C  New ABC book available from company T characterized by employing combo-drive in which DVD-RW as well as DVD-R is available. — D2b FIG. 9D  New ABC book available from company T characterized by employing combo-drive in which DVD-RW as well as DVD-R is available. — A2b

FIG. 10

SYSTEM AND METHOD OF MAKING SEARCH FOR DOCUMENT IN ACCORDANCE WITH QUERY OF NATURAL LANGUAGE

CROSS-REFERENCE TO RELATED APPLICATIONS

This application is based upon and claims the benefit of priority from prior Japanese Patent Application No. 2005-071032, filed Mar. 14, 2005, the entire contents of which are incorporated herein by reference.

BACKGROUND OF THE INVENTION

1. Field of the Invention

The present invention relates to a system for making a search for a document in accordance with a query of a natural language. In particular, the present invention relates to a system and method for making a search for a document suitable to provide a user with a search result for queries of a plurality of matters.

2. Description of the Related Art

Conventionally, there has been well known a system (document search system) for, in accordance with a user's search request (query), making a search for a document (document data) that conforms to the search request from a database. A keyword or natural language is used for the search request. A document search system having applied thereto a technique described in Jpn. Pat. Appln. KOKAI Publication No. 7-182373 (hereinafter, referred to as prior art) is known as such a type of document search system, for example. The prior art is characterized in that an abstract of a searched document is generated as a search result, and a user is provided with the abstract together with the document (original-document). According to the prior art, the user can easily judge the original document provided together with the abstract is based on one's own intention from the provided abstract.

However, in the above-described prior art, it is not presumed that a plurality of matters (matters of the user's interest) are queried by the user's query using a natural language (question sentence). There is a possibility that, if two or more matters such as "teach XX and YY" are included in a query, a plurality of separate documents (hit documents) or abstract are acquired as a search result.

For example, in the case of a query sentence of querying two (a plurality of) matters such as "teach a color and manufacturer of a baggage", the following hit documents can be obtained in the above described prior art:

a) a document including all words "baggage", "color", and "manufacturer";

b) a document including words "baggage" and "color";

c) a document including words "color" and "manufacturer"; and d) a document including words "baggage" and "manufacturer".

Here, although the document falling under item a) above may be found, such a document is not always found. For example, in some cases, the document falling under item a) above is not found, but only the documents falling under items b) and d) may be found. In this case, the documents falling under items b) and d), respectively, are provided as separate items of information. However, these individual items of information provided are insufficient as an answer to a question.

BRIEF SUMMARY OF THE INVENTION

According to an embodiment of the present invention, there is provided a system for making a search for a document in accordance with a query of a natural language. The system includes: a first interface which accepts a user specified first question sentence represented in a natural language; question analysis means for analyzing the first question sentence accepted by the first interface, the question analysis means generating a plurality of second question sentences for individually querying each of a plurality of matters from the first question sentence when the first question sentence queries the plurality of matters; a search engine configured to make searches for documents which match respective matters queried by the plurality of second question sentences from a morphological index database by index searches according to the plurality of second question sentences generated by the question analysis means, the morphological index database storing morphological analysis results for a plurality of documents as indexes; and a second interface which provides a user with a search result for the first question having reflected thereon results of document searches for the plurality of second question sentences by the search engine.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A and 4B are views showing examples of a question sentence Q1 and a question sentence Q2 generated from the question sentence Q, respectively;

FIGS. 5A and 5B are views showing examples of a hit document D1 and an abstract A1 of the document as a search result for the question sentence Q1, respectively;

FIGS. 6A and 6B are views showing examples of a hit document D2 and an abstract A2 of the document as a search result for the question sentence Q2, respectively;

FIG. 7 is a view showing an example in which search results for the question sentences Q1 and Q2 have been concatenated with each other;

FIGS. 8A and 8B are views showing examples of a hit document D1$a$ and an abstract A1$a$ of the document, respectively, when the hit document D1$a$ and a hit document D1$b$ have been acquired as a search result for the question sentence Q1;

FIGS. 8C and 8D are views showing examples of a hit document D1$b$ and an abstract A1$b$ of the document, respectively, when the hit documents D1$a$ and D1$b$ have been acquired as a search result for the question sentence Q1;

FIGS. 9A and 9B are views showing examples of a hit document D2$a$ and an abstract A2$a$ of the document, respectively, when the hit document D2a and a hit document D2b have been acquired as a search result for the question sentence Q2;

FIGS. 9C and 9D are views showing examples of a hit document D2b and an abstract A2b of the document, respectively, when the hit documents D2a and D2b have been acquired as a search result for the question sentence Q2; and FIG. 10 is a view showing an example of a search request/tuning screen applied in the present embodiment.

DETAILED DESCRIPTION OF THE INVENTION

Figure 1:
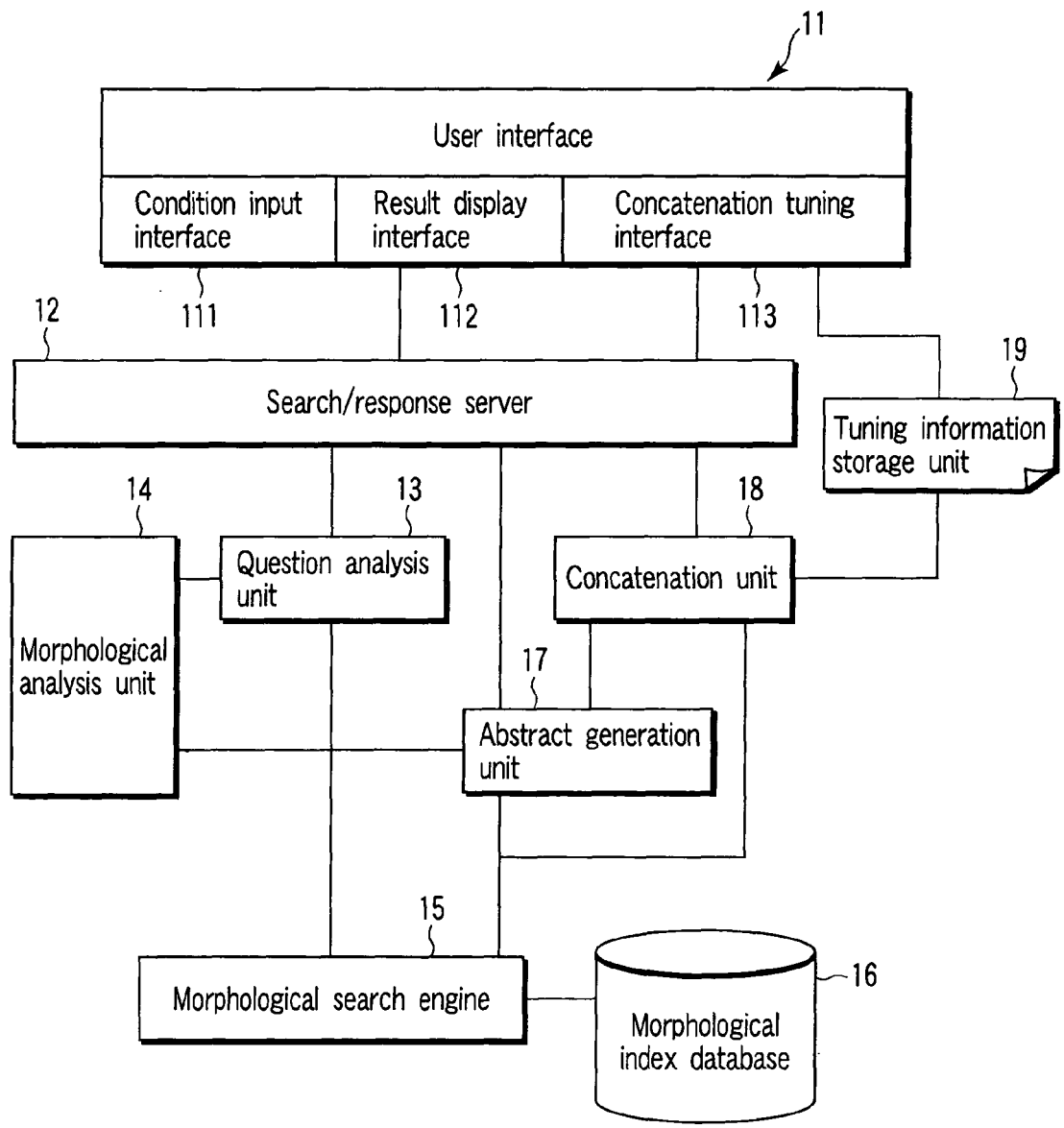
FIG. 1 is a block diagram showing the configuration of a document search system according to an embodiment of the present invention.

An embodiment of the present invention will be described with reference to the accompanying drawings. FIG. 1 is a block diagram showing the configuration of a document search system according to the embodiment of the present invention. The document search system is provided as a system for making a natural language search in accordance with a user's request (query). The document search system includes a user interface 11, a search/response server 12, a question analysis unit 13, a morphological analysis unit 14, a morphological search engine 15, a morphological index database 16, an abstract generation unit 17, a concatenation unit 18, and a tuning information storage unit 19.

The user interface 11 includes a condition input interface 111, a result display interface 112, and a concatenation tuning interface 113. The condition input interface (first interface) 111 has an interface function of inputting as a search condition a search request based on a user's search request, for example, a natural language query (namely, question sentence). The result display interface (second interface) 112 has an interface function of providing a user with a search result in response to a search request. The concatenation tuning interface (third interface) 113 has a concatenation tuning interface function described later. In the present embodiment, the user interface 11 is included in the document search system. However, the user interface 11 may be provided independently of the document search system. For example, the user interface 11 may be included in a client terminal connected to the document search system shown in FIG. 1 via a communication line (for example, network).

The search/response server 12 transfers a question sentence indicating a search request inputted (accepted) by the user interface 11 to the question analysis unit 13 for executing a search in accordance with the question sentence. The search/response server 12 causes the user interface 11 to provide a user with an abstract or a document as a response to a search request. The abstract is generated by the abstract generation unit 17. The above-described document provided to the user is a new document generated by the concatenation unit 18, for example, a new document in which an abstract and a searched document have been concatenated with each other.

The question analysis unit 13 executes morphological analysis and semantic analysis for a question sentence by using the morphological analysis unit 14. When the analyzed question sentence is a question sentence (first question sentence) for querying a plurality of matters, the question analysis unit 13 generates a plurality of question sentences (second question sentences) for individually querying respective ones of the plurality of matters from the question sentence.

The morphological analysis unit 14 executes morphological analysis for a question sentence requested from the question analysis unit 13. The morphological search engine 15 makes a morphological (index) search for each question sentence generated by the question analysis unit 13. The morphological search is made by referring to the morphological index database 16 with the use of morphemes that compose the corresponding question sentence. The database 16 stores information on a plurality of documents targeted for search by the morphological search engine 15. In more detail, the database 16 stores the morphological analysis results for the plurality of documents described above as indexes (morphological indexes). Each of the morphological indexes is prepared for each morpheme extracted by morphological analysis and semantic analysis for the plurality of documents. The morphological indexes include document information on all the documents in which the corresponding morphemes exist. The document information includes information indicating each of documents in which the corresponding morpheme exists and a position of the morpheme in each of the documents. Thus, the morphological search engine 15 acquires a search result that corresponds to the question sentence, i.e., a document hit to the question sentence by a morphological search for each question sentence using the morphological indexes stored in the database 16.

The abstract generation unit 17 executes morphological analysis and semantic analysis for a document searched by the morphological search engine 15 with the use of the morphological analysis unit 14. The abstract generation unit 17 correlates the results of the morphological analysis and semantic analysis for the searched document with the results of the morphological analysis and semantic analysis for a question sentence that corresponds to the document. The abstract generation unit 17 generates an abstract of the document from the searched document based on this correlation. This abstract can be regarded as a search result for a question sentence, like a document used for generation of the abstract, i.e., a document obtained as a search result for the question sentence.

The concatenation unit 18 generates a new document (search result document) based on documents (hit documents) searched for question sentences (second question sentences) generated by the question analysis unit 13 and abstracts generated from the documents. This search result document is generated by concatenating documents or abstracts (namely, search results), which correspond to the plurality of generated question sentences (namely, different question sentences). In this manner, from the search results of the morphological search engine 15 and abstract generation unit 17, which correspond to a plurality of generated question sentences (second question sentences), the concatenation unit 18 generates a new document into which search results corresponding to the plurality of question sentences are concatenated. The tuning information storage unit 19 stores tuning information including a condition for concatenation processing by the concatenation unit 18 (concatenation condition).

The user interface 11, the search/response server 12, the question analysis unit 13, the morphological analysis unit 14, the morphological search engine 15, the abstract generation unit 17, and the concatenation unit 18 can be achieved in such a manner that, for example, a computer reads and executes a specific software program stored in an external storage unit of the computer. The program can be distributed while it is stored in advance in a computer readable storage medium. In addition, the program may be downloaded via a network.

Now, a search process in the document search system shown in FIG. 1 will be described here. First, assume that a search request/tuning screen is displayed by the condition input interface 111 of the user interface 11 on a display unit of a client terminal. The search request/tuning screen is provided as a graphical user interface screen, and includes a question sentence input field F1 (refer to FIG. 10) as described later. By using the client terminal, a user can make an operation of inputting a question sentence of a natural language in the question sentence input field F1 on the search request/tuning screen.

Now, assume that, by an operation of inputting a question sentence, the user has requested a search (natural language search) according to a search condition indicated by the question sentence to the document search system shown in FIG. 1. The condition input interface 111 inputs a question sentence from the client terminal in accordance with the user's question sentence input operation. The condition input interface 111 accepts the inputted question sentence as the user's query (search request) using a natural language. The condition input interface 111 transfers this question sentence to the search/response server 12.

The search/response server 12 having received the question sentence from the condition input interface 111 transfers the question sentence to the question analysis unit 13 for executing a natural language search in accordance with the question sentence. The question analysis unit 13 having received the question sentence from the search/response server 12 transfers the question sentence to the morphological analysis unit 14, thereby requesting morphological analysis for the question sentence to the unit 14. In this manner, the morphological analysis unit 14 morphologically analyzes the question sentence transferred from the question analysis unit 13, and divides the question sentence on a word by word basis. The morphological analysis unit 14 returns the morphological analysis result for the question sentence to the question analysis unit 13.

The question analysis unit 13 analyzes the meaning of the question sentence by using the morphological analysis result obtained by the morphological analysis unit 14 relevant to the question sentence received from the search/response server 12. In this manner, the question analysis unit 13 executes morphological analysis and semantic analysis for the question sentence received from the search/response server 12 by utilizing the morphological analysis unit 14. The question analysis unit 13 determines whether or not the question sentence queries a plurality of matters, based on the results of the morphological analysis and semantic analysis for the question sentence.

If the above question sentence is a question sentence (first question sentence) for querying a plurality of matters, the question analysis unit 13 generates a plurality of question sentences (second question sentences) for individually querying respective ones of the plurality of matters from the first question sentence. Namely, the plurality of generated second question sentences are produced as question sentences each querying one matter. The question analysis unit 13 transfers the plurality of second question sentences generated from the first question sentence to the morphological search engine 15, thereby making morphological search by the engine 15 based on each of the plurality of second question sentences.

The morphological search engine 15 executes a search based on each of the plurality of second question sentences generated from the user specified first question sentence. That is, the morphological search engine 15 uses morphological indexes stored in the morphological index database 16 to make a search for a document (hit document) that conforms to each of the plurality of second question sentences from the database 16. At this time, a document including all the words included in the question sentence may be defined as a hit document. In addition, a document including any of the words included in the question sentence may be defined as a hit document.

The morphological search engine 15 transfers hit documents that match the second question sentences to the abstract generation unit 17 and the concatenation unit 18 as morphological search results for the plurality of second question sentences. The morphological search engine 15 also transfers to the abstract generation unit 17 the results of the morphological analysis and semantic analysis obtained by the question analysis unit 13 relevant to the plurality of second question sentences.

Having received the search results for the plurality of second question sentences from the morphological search engine 15, the abstract generation unit 17 executes an abstract generation process described below. First, the abstract generation unit 17 uses the morphological analysis unit 14 to make morphological analysis and semantic analysis for hit documents relevant to the plurality of second question sentences. The abstract generation unit 17 makes the following comparison and correlation for each of hit documents relevant to the plurality of second question sentences. The abstract generation unit 17 compares and correlates the results of the morphological analysis and semantic analysis for the hit document with the results of the morphological analysis and semantic analysis for the second question sentence (second question sentence corresponding to the hit document). The abstract generation unit 17 generates an abstract of each hit document by specifying a portion suitable for an abstract in the hit document by such comparison and correlation of each hit document.

Now, a detailed description will be given with respect to abstract generation by the abstract generation unit 17. In the present embodiment, a document portion that can be specified as an abstract is referred to as a target range. The abstract generation unit 17 divides a hit document into a plurality of document portions, for example, on a paragraph by paragraph basis, on a line feed by line feed basis, or on a sign by sign basis indicating the end of a sentence. The abstract generation unit 17 handles each of the divided document portions as a target range. The abstract generation unit 17 compares and correlates the results of the morphological analysis and semantic analysis for the corresponding document portion with the results of the morphological analysis and semantic analysis for the corresponding second question sentence on a range by range basis. By such comparison and correlation, the abstract generation unit 17 specifies the closest range to a second question sentence for each hit document relevant to the second question sentence. The abstract generation unit 17 generates a document portion in a range specified for each hit document (namely, at least part of the hit document) as an abstract of each hit document. Similarly, the abstract generation unit 17 generates an abstract (or abstracts) of a hit document (or hit documents) relevant to the remaining one (s) of the plurality of second question sentences. The abstract generation unit 17 transfers the abstracts of hit documents relevant to the plurality of second question sentences to the search/response server 12 and the concatenation unit 18 as the search results for the plurality of second question sentences.

The concatenation unit 18 executes a concatenation process by utilizing search results (hit documents) for the plurality of second question sentences transferred by the morphological search engine 15 and search results (abstracts of the hit documents) for the plurality of second question sentences transferred by the abstract generation unit 17. The concatenation unit 18 executes this concatenation process in accordance with a concatenation condition indicated by the tuning information stored in the tuning information storage unit 19.

In the concatenation process by the concatenation unit 18, a corresponding one of the search results (for example, abstract of hit document) is selected in response to each of a plurality of second question sentences generated from the user specified first question sentence. Then, one document with which the selected search results have been concatenated is generated as a search result (search result document) for the first question sentence. The document generated in accordance with the concatenation process by the concatenation unit 18 is transferred to the result display interface 112 of the user interface 11 via the search/response server 12, and the user is provided with the transferred document by the interface 112.

Now, with reference to a flow chart shown in FIG. 2, a detailed description will be given to a question analysis process including a question sentence generation process by the question analysis unit 13. First, the question analysis unit 13 utilizes the morphological analysis unit 14 to execute morphological analysis for a first question sentence received from the search/response server 12 (step S1). In this step S1, the morphological analysis unit 14 uses a result of the morphological analysis for the first question sentence by the morphological analysis unit 14 to analyze the meaning of the question sentence. The semantic analysis allows the morphological analysis unit 14 to, with respect to a specific word that meets a predetermined condition, specify the meaning of that word (for example, time, person, place etc.).

Next, the question analysis unit 13 classifies each of nouns included in the semantically analyzed first question sentence into types of terms that can be associated with the query (step S2). Here, as types of terms that can be associated with the query, there have been predetermined in advance: common nouns; proper nouns; terms relating to organization; terms relating to areas; terms relating to units (for example, postfix used in combination with numerals); terms relating to evaluation; and the like.

Then, the question analysis unit 13 evaluates a connection relationship between the nouns classified in the step S2 (step S3). Here, when the first question sentence is in the Japanese language, a connection relationship based on a postposition that exist between nouns (corresponding to preposition "of" in the English language). When the first question sentence is in the English language, a connection relationship based on the preposition "of" that exists between nouns is evaluated. The question analysis unit 13 specifies (extracts) a noun that corresponds to a subjective case of the above question sentence, based on an evaluation result of the connection relationship in the step S3 (step S4).

The question analysis unit 13 determines whether or not an unprocessed noun (namely, unprocessed noun excluding a noun corresponding to a subjective case) is included in the first question sentence (step S5). If an unprocessed noun is included in the first question sentence, the question analysis unit 13 extracts one unprocessed noun from the first question sentence (step S6). The question analysis unit 13 connects (combines): the noun corresponding to the subjective case specified in the step S4; the noun extracted in the step S6; and the term representing a query included in the first question sentence with each other, thereby generating one question sentence (second question sentence) for querying one matter (step S7). When a first question sentence is in the Japanese language, terms representing a query include a verb (such as "oshiete" (teach)) or demonstrative pronouns (such as nani (what?) and doko (where?)) representing, for example, an object, a place, and a direction peculiar to the first question sentence. These Japanese demonstrative pronouns correspond to English interrogative demonstrative pronouns or interrogative adverbs.

The question analysis unit 13 repeats the processing operations in the steps S5 to S7 until unprocessed nouns have been eliminated from the first question sentence. In this manner, the question analysis unit 13 generates from the first question sentence for querying a plurality of matters the same number of second question sentences as the plurality of matters, the second question sentences querying a respective one matter. The plurality of generated second question sentences are transferred to the morphological search engine 15.

Now, exemplary examples of the above-described question analysis process and concatenation process will be described with reference to FIG. 3, FIGS. 4A and 4B, FIGS. 5A and 5B, FIGS. 6A and 6B and FIG. 7. The question analysis process includes a process for generating a plurality of second question sentences for querying one matter from a first question sentence for querying a plurality of matters. The concatenation process includes a process for concatenating, for example, abstracts of hit documents by utilizing search results for the plurality of second question sentences.

Figures 2, 3:
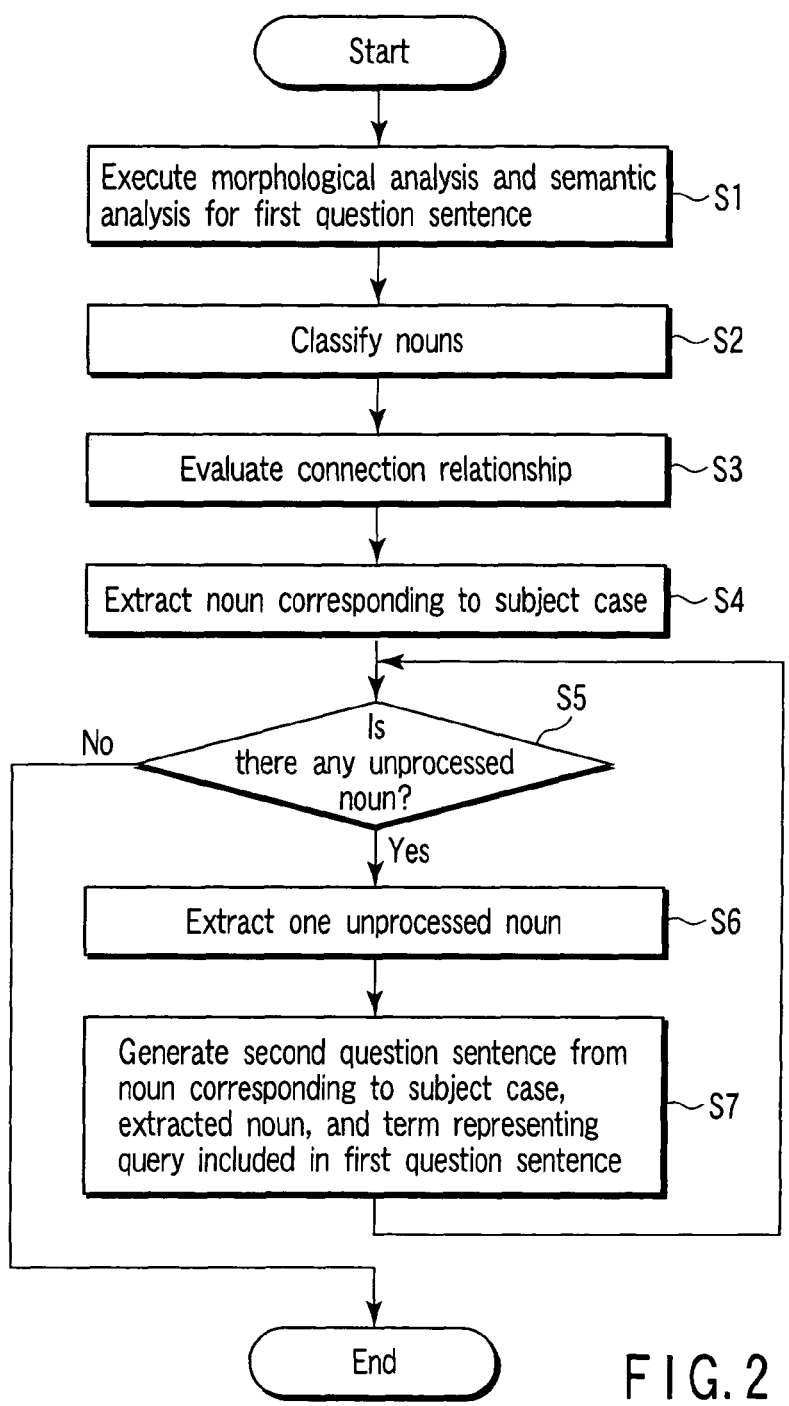
FIG. 2 is a flow chart showing procedures for a question analyzing process that includes a question sentence generating process by a question analysis unit 13 in the present embodiment.
FIG. 3 is a view showing an example of a user specified question sentence Q in the present embodiment.

First, assume that a query (search request) by a question sentence (first question sentence) Q shown in FIG. 3 has been requested by user's operation to the user interface 11 of the document search system 1 shown in FIG. 1. The question sentence Q is "Teach a sales price and features of ABC book". Here, presume that the question sentence Q has been inputted in the Japanese language. In FIG. 3, a Japanese Roman character notation "ABC bukku no urine to tokuchou wo oshiete" is also indicated as the question sentence Q, the notion corresponding to the Japanese language notation. The question sentence Q queries the sales price and features of a personal computer called "ABC book". This question sentence Q is divided into "ABC bukku (proper noun), "no" "urine" "to" "tokuchou" "wo" "oshie" and "te" by morphological analysis using the morphological analysis unit 14.

The question analysis unit 13 executes the above steps S1 to S4 by using this morphological analysis result. In this manner, the question analysis unit 13 extracts "ABC book (ABC bukku)" as a noun corresponding to a subjective case from the question sentence Q shown in FIG. 3.

Next, the question analysis unit 13 sequentially extracts "sales price (urine)" and "features (tokuchou)" as nouns other than the noun "ABC book (ABC bukku)" serving as a noun corresponding to a subjective case from the question sentence Q (step S6). The question analysis unit 13 generates a plurality of question sentences (question sentences Q1 and Q2) as follows by using the "ABC book" which is the noun corresponding to the subjective case, and "sales price" and "features" (step S7). First, the question analysis unit 13 generates "sales price of ABC book" and "features of ABC book" by concatenating "sales price" and "feature" with respect to "ABC book". Next, the question analysis unit 13 extracts a term representing a query that can be connected by "sales price of ABC book (ABC bukku no urine)" and "features of ABC book (ABC bukku no tokuchou)" and postposition (in the Japanese language) from the question sentence Q. Terms representing the query are "verb", "what?", "where?" and the like. Here, the verb "teach (oshiete)" is extracted. Then, the question analysis unit 13 concatenates each of "sales price of ABC book (ABC bukku no urine)" and "features of ABC book (ABC bukku no tokuchou)" with "teach (oshiete)". This concatenation makes it possible to generate question sentences (second question sentences) Q1 and Q2 shown in FIGS. 4A and 4B, the question sentences being broken down from the question sentence (first question sentence) Q. The question sentence Q1 is "Teach sales price of ABC book" (ABC bukku no urine wo oshiete), and the question sentence Q2 is "Teach features of ABC book" (ABC bukku no tokuchou wo oshiete). In the Japanese language, "ABC bukku no urine" (sales price of ABC book) and "ABC bukku no tokuchou" (features of ABC book) each are concatenated with "oshiete" (Teach) and postposition "wo".

The morphological search engine 15 makes searches for documents that match the question sentences Q1 and Q2 from the morphological index database 16 by a search process according to the question sentence Q1 "Teach sales price of ABC book" and the question sentence Q2 "Teach features of ABC book". On the other hand, the abstract generation unit 17 generates abstracts of documents (hit documents) that match the question sentences Q1 and Q2.

In the present embodiment, assume that a hit document D1 shown in FIG. 5A has been acquired as a hit document matching the question sentence Q1, and then, an abstract A1 shown in FIG. 5B has been acquired as an abstract of the hit document D1. Here, the abstract A1 is provided as part of the hit document D1. Similarly, assume that a hit document D2 shown in FIG. 6A has been acquired as a hit document matching the question sentence Q2, and then, an abstract A2 shown in FIG. 6B has been generated as an abstract of the hit document D2. Here, the abstract A2 is provided as the hit document D2 itself. In this way, the hit document D1 and the abstract A1 are acquired as the search results for the question sentence Q1, and the hit document D2 and the abstract A2 are acquired as the search results for the question sentence Q2.

The concatenation unit 18 generates (acquires) a search result (search result document) for a question sentence Q shown in FIG. 3 from two types of search results (D1 and A1) for the question sentence Q1 and two types of search results (D2 and A2) for the question sentence Q2. The search result for the question sentence Q is generated in accordance with the tuning information stored in the tuning information storage unit 19. Here, the concatenation unit 18 concatenates one of the two types of search results (D1 and A1) for the question sentence Q1, for example, the abstract A1, and one of the two types of search results (D2 and A2) for the question sentence Q2, for example, the abstract A2, with each other. This makes it possible to generate a document RD shown in FIG. 7. In addition, by specifying the above described tuning information, it is possible to concatenate one of the two types of search results for the question sentence Q1, for example, the hit document D1, and one of the two types of search results for the question sentence Q2, for example, the abstract A2, with each other. In contrast, it is possible to concatenate one of the two types of search results for the question sentence Q1, for example, the abstract A1, and one of the two types of search results for the question sentence Q2, for example, the hit document D2, with each other. In addition, it is also possible to concatenate the hit documents, namely, the hit documents D1 and D2 with each other. In this way, a concatenation target is selected in accordance with tuning information in the present embodiment. The tuning information can be set in accordance with a user's operation, as described later. For this reason, the user can be provided with an answer covering more required information for the user.

In this manner, when there have been acquired search results for each of the two question sentences Q1 and Q2 generated from the user specified question sentence Q, the concatenation unit 18 concatenates one of the search results for the question sentence Q1 and one of the search results for the question sentence Q2 with each other. This concatenation makes it possible for the concatenation unit 18 to generate a search result (search result document) for the question sentence Q (original question sentence Q shown in FIG. 3). The generated search result includes the search result for each of the question sentences Q1 and Q2. Namely, the generated search result reflects the search result for each of the question sentences Q1 and Q2. This implies that the generated search result includes the search results for queries of two matters caused by the original question sentence Q. Therefore, the user is provided with thus generated search result, namely, the search result (search result document) relevant to the question sentence Q1, thereby making it possible for the user to clearly recognize a correlation with individual matters queried by the question sentence Q. Here, link information may be set to the search result document relevant to the question Q by the concatenation unit 18. The link information is used to refer to the original documents used to generate the search result documents (namely, hit documents D1 and D2 relevant to queries of question sentences Q1 and Q2, respectively).

In the meantime, the question sentences Q1 and Q2 are queries of one matter, respectively. Thus, the search results for queries of the question sentences Q1 and Q2 (hit documents and their abstracts) are expected to completely match the queries of the question sentences Q1 and Q2 unlike queries of two matters such as the original question sentence Q. Thus, the user may be provided with the search results for queries of the question sentences Q1 and Q2 (at least one of a hit document and its abstract, for example) so as to be associated with the question sentences Q1 and Q2, respectively. In this case, the user can easily imagine a search result for the original question sentence from the search result for each of the question sentences Q1 and Q2. Here, the above-described concatenation process by the concatenation unit 18 is eliminated.

Now, with reference to FIGS. 8A, 8B, 8C and 8D; and FIGS. 9A, 9B, 9C and 9D, a description will be given to an exemplary example of a concatenation process in the case where a plurality of documents have been searched for each of the question sentences Q1 and Q2 generated from the question sentence Q. The concatenation unit 18 basically generates all the combinations between abstracts of a plurality of hit documents relevant to the question sentence Q1 and abstracts of a plurality of hit documents relevant to the question sentence Q2 as search results for the original question sentence Q.

However, when a plurality of abstracts determined to be analogous contents are included in abstracts of a plurality of hit documents relevant to one question sentence, the concatenation unit 18 handles the abstracts of the plurality of hit documents as follows. That is, the concatenation unit 18 handles only one of the plurality of abstracts determined to be the analogous contents as the corresponding abstracts of the plurality of hit documents. Here, a condition in which a plurality of abstracts are determined to be analogous contents is as follows. First, one question sentence corresponding to a plurality of abstracts is represented by a question sentence Qi. In this case, the above-described condition is that features of first nouns are analogous to each other among the plurality of abstracts, and that features of second nouns are analogous to each other among the plurality of abstracts, and that features of terms (corresponding to an answer to a query) are analogous to each other among the plurality of abstracts. The first nouns, the second nouns and the terms are included in the plurality of abstracts. The first nouns correspond to a subjective noun included in the question sentence Qi. The subjective noun implies a noun corresponding to a subjective case. The second nouns denote nouns which have connection relationships with the first nouns, and correspond to a noun which has a connection relationship with the subjective noun included in the question sentence Qi. The nouns having the connection relationships with the first nouns implies nouns connected to the first nouns by postpositions in the case of the Japanese language.

Now, assume that the hit documents relevant to the question sentence Q1 are hit documents D1a and D1b shown in FIGS. 8A and 8C, respectively, and their abstracts are abstracts A1a and A1b shown in FIGS. 8B and 8D, respectively. Similarly, the hit documents relevant to the question sentence Q2 are hit documents D2a and D2b shown in FIGS. 9A and 9C, respectively, and their abstracts are abstracts A2a and A2b shown in FIGS. 9B and 9D, respectively.

The concatenation unit 18 basically handles as the search results for the original question sentence Q all the combinations between each of the abstracts A1a and A1b corresponding to the question sentence Q1 and each of the abstracts A2a and A2b corresponding to the question sentence Q2. Namely, the concatenation unit 18 generates the following documents as the search results for the original question sentence Q:

(1) a document whose abstracts A1a and A2a have been concatenated with each other;

(2) a document whose abstracts A1a and A2b have been concatenated with each other;

(3) a document whose abstracts A1b and A2a have been concatenated with each other; and (4) a document whose abstracts A1b and A2b have been concatenated with each other.

However, when the abstracts A1a and A1b corresponding to the question sentence Q1 are analogous to each other, the concatenation unit 18 causes the abstract corresponding to the question sentence Q1 to be represented by one of the abstracts A1a and A1b. Similarly, in the case where the abstracts A2a and A2b corresponding to the question sentences Q2 are analogous to each other, the concatenation unit 18 causes the abstract corresponding to the question sentence Q2 to be represented by one of the abstracts A2a and A2b.

As is evident from FIGS. 8B and 8D, a first noun (proper noun) included in each of the abstracts A1a and A1b corresponding to the question sentence Q1 is an "ABC book". A second noun included in each of the abstracts A1a and A1b, namely, a noun corresponding to a noun "sales price" connected to a subjective noun "ABC book" in the question sentence Q1 is a "price". A term representing an answer to query "Teach sales price", the term being included in each of the abstracts A1a and A1b, is 220,000 Yen (numeric value+ unit). Namely, in the abstracts A1a and A1b corresponding to the question sentence Q1, the features of words or terms are identical (analogous) to each other. Therefore, the concatenation unit 18 determines that the abstracts A1a and A1b corresponding to the question sentence Q1 are analogous to each other in their contents. The concatenation unit 18 causes the abstract corresponding to the question sentence Q1 to be represented by either one of the abstracts A1a and A1b, for example, by the abstract A1a. In this case, the concatenation unit 18 generates two combinations shown in items (1) and (2) from among the above four combinations as the search results for the original question sentence Q. This makes it possible to reduce the number of unnecessary combinations when the search results for the question sentences Q1 and Q2 are concatenated as the search results for the original question sentence Q. Similarly, this can also apply to a case in which the hit documents relevant to the question sentence Q1 or Q2 are handled as concatenation targets, as described later.

Now, with reference to FIG. 10, a description will be given to setting of tuning information by the concatenation tuning interface 113 of the user interface 11. FIG. 10 shows an example of a search request/tuning screen. First, assume that a user has made predetermined operation by using a client terminal (or input device of the document search system) in order to input a question sentence. Then, the concatenation tuning interface 113 displays the search request/tuning screen shown in FIG. 10 on a display unit of the client terminal.

The search request/tuning screen includes a question sentence input area 101, a concatenation tuner area 102, and a search instruction area 103. The question sentence input area 101 includes a question sentence input field F1 for causing a user to input a question sentence (first question sentence). The concatenation tuner area 102 includes checkboxes CB1, CB2, CB3, CB4 and CB5 for causing a user to set a concatenation condition regarding a concatenation process by the concatenation unit 18. The search instruction area 103 includes a search execution button B1. The button B1 enables a user to instruct the system shown in FIG. 1 execution of a search according to a question sentence inputted in the question sentence input field F1 and execution of a concatenation process according to a concatenation condition set in the concatenation tuner area 102.

The checkbox CB1 enables a user to instruct the system shown in FIG. 1 whether to break down a user specified first question sentence inputted in the question sentence input field F1 into a plurality of second question sentences, and then, whether to concatenate search results for the plurality of second question sentences. The above embodiment presumes a case in which the concatenation of search results has been instructed in the checkbox CB1.

The checkbox CB2 enables a user to instruct the system whether to prioritize document concatenation more than abstract concatenation in concatenation of search results. Namely, the user can instruct the system as to which of the abstract and document concatenations should be prioritized by using the checkbox CB2. The above embodiment presumes a case in which a failure to prioritize document concatenation more than abstract concatenation (namely, prioritizing abstract concatenation more than document concatenation) has been instructed in the checkbox CB2. If prioritizing document concatenation has been instructed, the hit document D1 shown in FIG. 5A and the hit document D2 shown in FIG. 6A are concatenated with each other.

The checkbox CB3 enables a user to instruct the system whether or not to set a maximum number of lines "x" of a document in the case of concatenating documents. The concatenation tuner area 102 includes a maximum number-of-lines input field F2 for a user to input the maximum number of lines "x" of a document. This field F2 is allocated to be associated with the checkbox CB3. If setting the maximum number of lines "x" of a document has been instructed and the number of lines of documents to be concatenated exceeds "x", for example, an abstract is used instead of the document. The checkbox CB4 enables a user to instruct the system whether or not to concatenate a plurality of search results with each other relevant to one of a plurality of second question sentences (namely, same question sentence) when the plurality of search results have been acquired in the one second question sentence.

The checkbox CB5 enables a user to instruct the system whether or not to specify a type (abstract or hit document) of search results (namely, concatenation target) to be concatenated for each of the second question sentences. When specifying the type of the search results to be concatenated has been instructed by using the checkbox CB5, the concatenation tuning interface 113 displays an input field for a user to specify the type of the search results to be concatenated for each of the second question sentences in proximity to the checkbox CB5. By using this field, the user can instruct the concatenation tuning interface 113 to, for example, use the abstract A1 as a search result of the question sentence Q1 and use the hit document D2 as a search result of the question sentence Q2.

It is also possible to allocate in the concatenation tuner area 102 a checkbox for causing a user to instruct whether the search results corresponding to a plurality of second question sentences are concatenated with each other in order of question sentences or in its reversed order.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A apparatus for making a search for a document in accordance with a query of a natural language, comprising:
   a first interface unit configured to input a user specified first question sentence represented in a natural language, the first question sentence including a term representing a query;
   a morphological analysis unit configured to execute morphological analysis for the first question sentence input by the first interface unit, thereby to divide the question sentence on a word by word basis;
   a question analysis unit configured to analyze the first question sentence, thereby to generate a plurality of second question sentences from the first question sentence, wherein the question analysis unit includes:
      a first module configured to specify, based on a morphological analysis result by the morphological analysis unit, a first noun that corresponds to a subjective case of the first question sentence and is included in the first question sentence;
      a second module configured to extract one second noun or a plurality of second nouns, which are included in the first question sentence, other than the first noun from the first question sentence based on the morphological analysis result; and
      a third module configured to connect the first noun, each of the plurality of second nouns, and the term representing the query included in the first question sentence for said each of the plurality of second nouns when the plurality of second nouns are extracted, thereby to generate the plurality of second question sentences, each including the first noun, at least one of the plurality of second nouns, and the term representing the query, for individually querying each of a plurality of matters, the first noun also corresponding to the subjective case of each of the plurality of second question sentences;
   a search engine configured to make searches for documents which match respective matters queried by the plurality of second question sentences from a morphological index database by index searches according to the plurality of second question sentences generated by the question analysis unit, the morphological index database storing morphological analysis results for a plurality of documents as indexes;
   a storage unit which stores tuning information, the tuning information including a concatenation condition for specifying which of documents acquired by the document searches by the search engine and abstracts of the acquired documents are used as search results for the plurality of second question sentences;
   a concatenation unit configured to select the documents acquired by the document searches by the search engine or the abstracts of the acquired documents as the search results for the plurality of second question sentences to be concatenated with each other in accordance with the tuning information stored in the storage unit, thereby to generate a search result document which represents a search result for the first question sentence by concatenating search results for the plurality of second question sentences by the search engine; and
   a second interface unit configured to provide a user with the search result document generated by the concatenation unit as a search result for the first question sentence.

2. The apparatus according to claim 1, wherein, when a search result for one of the plurality of second question sentences includes a plurality of search results analogous to each other, the concatenation unit handles only one of the analogous search results as a search result for the one second question sentence.

3. The apparatus according to claim 1, further comprising an abstract generation unit configured to generate abstracts of documents acquired by the document searches for the plurality of second question sentences by the search engine.

4. The apparatus according to claim 1, further comprising a third interface unit configured to provide a user with a user interface screen for causing the user to specify the concatenation condition, the third interface unit storing in the storage unit the tuning information including the concatenation condition specified by the user on the user interface screen.

5. The apparatus according to claim 4, wherein the user interface screen includes an area which causes a user to specify which of the documents acquired by the document searches by the search engine and the abstracts of the acquired documents are used as search results for the plurality of second question sentences to be concatenated with each other by the concatenation unit.

6. The apparatus according to claim 4, wherein:
   the user interface screen includes an area which causes a user to specify a maximum number of lines of a document which is usable for concatenation by the concatenation unit, and
   when the number of lines of a document to be concatenated exceeds the maximum number of lines specified by the user on the user interface screen, the concatenation unit uses an abstract of the document instead of the document to be concatenated.

7. The apparatus according to claim 4, wherein, when a plurality of search results exist with respect to one of the plurality of second question sentences, the user interface screen includes an area which causes the user to instruct the apparatus whether to concatenate the plurality of search results with each other as a search result for the one second question sentence.

8. The apparatus according to claim 1, wherein the concatenation unit sets link information for referring documents acquired by document searches for the plurality of second question sentences by the search engine to a search result document which represents a search result for the first question sentence.

9. A method for making a search for a document in accordance with a query of a natural language, in document search apparatus with a storage unit, comprising:
   inputting a user specified first question sentence represented in a natural language, the first question sentence including a term representing a query;

executing morphological analysis for the first question sentence, thereby to divide the question sentence on a word by word basis;

analyzing the first question sentence, thereby to generate a plurality of second question sentences from the first question sentence, wherein the analyzing includes:

specifying, based on a morphological analysis result by the morphological analysis, a first noun that corresponds to a subjective case of the first question sentence and is included in the first question sentence;

extracting one second noun or a plurality of second nouns, which are included in the first question sentence, other than the first noun from the first question sentence based on the morphological analysis result; and connecting the first noun, each of the plurality of second nouns, and the term representing the query included in the first question sentence for said each of the plurality of second nouns when the plurality of second nouns are extracted, thereby to generate the plurality of second question sentences, each including the first noun, at least one of the plurality of second nouns, and the term representing the query, for individually querying each of a plurality of matters, the first noun also corresponding to the subjective case of each of the plurality of second question sentences;

making searches for documents which match respective matters queried by the plurality of second question sentences from a morphological index database by index searches according to the plurality of second question sentences, the morphological index database storing morphological analysis results for a plurality of documents as indexes;

selecting the documents acquired by the document searches or the abstracts of the acquired documents as the search results for the plurality of second question sentences to be concatenated with each other in accordance with tuning information stored in the storage unit, the tuning information including a concatenation condition for specifying which of documents acquired by the document searches and abstracts of the acquired documents are used as search results for the plurality of second question sentences;

generating a search result document which represents a search result for the first question sentence by concatenating search results for the plurality of second question sentences by the document searches; and providing a user with the search result document as a search result for the first question sentence.

10. A computer-readable storage medium storing a computer program product for use in a document search in accordance with a query of a natural language, the computer program product being employed in a computer with a storage unit, the computer program product implementing a method comprising:

causing the computer to input a user specified first question sentence represented in a natural language, the first question sentence including a term representing a query;

causing the computer to execute morphological analysis for the first question sentence, thereby to divide the question sentence on a word by word basis;

causing the computer to analyze for the first question sentence, thereby to generate a plurality of second question sentences from the first question sentence, wherein the causing the computer to analyze includes:

causing the computer to specify, based on a morphological analysis result by the morphological analysis, a first noun that corresponds to a subjective case of the first question sentence and is included in the first question sentence;

causing the computer to extract one second noun or a plurality of second nouns other than the first noun, which are included in the first question sentence, from the first question sentence based on the morphological analysis result; and causing the computer to connect the first noun, each of the plurality of second nouns, and the term representing the query included in the first question sentence for said each of the plurality of second nouns when the plurality of second nouns are extracted, thereby to generate the plurality of second question sentences, each including the first noun, at least one of the plurality of second nouns, and the term representing the query, for individually querying each of a plurality of matters, the first noun also corresponding to the subjective case of each of the plurality of second question sentences;

causing the computer to search for documents which match respective matters queried by the plurality of second question sentences from a morphological index database by executing index searches in accordance with the plurality of second question sentences, the morphological index database storing morphological analysis results for a plurality of documents as indexes;

causing the computer to select the documents acquired by the document searches or the abstracts of the acquired documents as the search results for the plurality of second question sentences to be concatenated with each other in accordance with tuning information stored in the storage unit, the tuning information including a concatenation condition for specifying which of documents acquired by the document searches and abstracts of the acquired documents are used as search results for the plurality of second question sentences;

causing the computer to generate a search result document which represents a search result for the first question sentence by concatenating search results for the plurality of second question sentences by the document searches; and causing the computer to provide a user with the search result document as a search result for the first question sentence.

* * * * *

UNITED STATES PATENT AND TRADEMARK OFFICE
CERTIFICATE OF CORRECTION

PATENT NO. : 7,765,201 B2  Page 1 of 1
APPLICATION NO. : 11/373991
DATED : July 27, 2010
INVENTOR(S) : Takachio et al.

It is certified that error appears in the above-identified patent and that said Letters Patent is hereby corrected as shown below:

Col. 1
\* Title page, Item (54), in the Title, line 1, change "OF MAKING" to --FOR MAKING--.

\* Title page, Item (75), in the Inventors, line 2, change "Sendai (JP)" to --Kawasaki (JP)--.

Col. 2
\* Title page, Item (74), in the *Attorney, Agent or Firm,* line 1, change "Henerson," to --Henderson--.

Claim 1, column 13, line 18, change "A apparatus" to --An apparatus--.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,765,201 B2 | Page 1 of 1 |
| APPLICATION NO. | : 11/373991 | |
| DATED | : July 27, 2010 | |
| INVENTOR(S) | : Takachio et al. | |

It is certified that error appears in the above-identified patent and that said Letters Patent is hereby corrected as shown below:

\* Title page, Item (54) and at Column 1, in the Title, line 1, change "OF MAKING" to --FOR MAKING--.

\* Title page, Item (75), in the Inventors, line 2, change "Sendai (JP)" to --Kawasaki (JP)--.

Col. 2
\* Title page, Item (74), in the *Attorney, Agent or Firm,* line 1, change "Henerson," to --Henderson--.

Claim 1, column 13, line 18, change "A apparatus" to --An apparatus--.

This certificate supersedes the Certificate of Correction issued November 16, 2010.

Signed and Sealed this

Fourteenth Day of December, 2010

David J. Kappos
*Director of the United States Patent and Trademark Office*